US011065961B2

(12) United States Patent
Ichikawa et al.

(10) Patent No.: US 11,065,961 B2
(45) Date of Patent: Jul. 20, 2021

(54) ELECTRIC CIRCUIT AND DIAGNOSIS METHOD

(71) Applicant: HONDA MOTOR CO., LTD., Tokyo (JP)

(72) Inventors: Hiroki Ichikawa, Wako (JP); Jun Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 16/473,655

(22) PCT Filed: Nov. 28, 2017

(86) PCT No.: PCT/JP2017/042479
§ 371 (c)(1),
(2) Date: Jun. 26, 2019

(87) PCT Pub. No.: WO2018/123391
PCT Pub. Date: Jul. 5, 2018

(65) Prior Publication Data
US 2019/0356139 A1 Nov. 21, 2019

(30) Foreign Application Priority Data
Dec. 28, 2016 (JP) .............................. JP2016-256141

(51) Int. Cl.
*B60L 3/00* (2019.01)
*B60L 58/12* (2019.01)
(Continued)

(52) U.S. Cl.
CPC ................. *B60L 3/00* (2013.01); *B60L 58/12* (2019.02); *B62K 11/00* (2013.01); *H02J 7/0013* (2013.01)

(58) Field of Classification Search
CPC .. B60L 3/00; B60L 58/12; B62K 11/00; H02J 7/0013; H02J 7/00
See application file for complete search history.

(56) References Cited

U.S. PATENT DOCUMENTS 6,140,800 A * 10/2000 Peterson ............... H02J 7/0018
320/118
9,225,191 B2 * 12/2015 Drobnik ............... H02J 7/0019
(Continued)

FOREIGN PATENT DOCUMENTS

JP          01-248935         10/1989
JP          2001-186668        7/2001
(Continued)

OTHER PUBLICATIONS

Japanese Notice of Allowance for Japanese Patent Application No. 2018-558919 dated Dec. 24, 2019.
International Search Report and Written Opinion for International Application No. PCT/JP2017/042479 dated Jan. 16, 2018, 9 pgs.

*Primary Examiner* — Vuthe Siek
(74) *Attorney, Agent, or Firm* — Amin, Turocy & Watson, LLP

(57) ABSTRACT

An electric circuit switches connection among a plurality of storage cell units including a first storage cell unit and a second storage cell unit, a load of the plurality of storage cell units, and a power supply supplying power to the plurality of storage cell units. The electric circuit includes: a first rectifier configured to rectify a current flowing between a first pole terminal of the power supply and a first pole terminal of the first storage cell unit with homopolarity as polarity of the first pole terminal of the power supply; a second rectifier configured to rectify a current being different from the current and flowing between the first pole terminal of the power supply and a first pole terminal of the second storage cell unit with homopolarity as the polarity of the first pole terminal of the power supply; and a connection (Continued)

switching device configured to connect the plurality of storage cell units in series between the first pole terminal of the first storage cell unit and the first pole terminal of the second storage cell unit and release the series connection of the plurality of storage cell units during a period in which the power supply supplies power to the plurality of storage cell units.

15 Claims, 9 Drawing Sheets

(51) Int. Cl.
  B62K 11/00 (2006.01)
  H02J 7/00 (2006.01)

(56) References Cited

U.S. PATENT DOCUMENTS

| | | | |
|---|---|---|---|
| 2001/0005125 | A1 | 6/2001 | Nagai et al. |
| 2003/0099121 | A1* | 5/2003 | Yang ........................ H02J 7/345 363/125 |
| 2012/0313584 | A1* | 12/2012 | Sugiyama ............... B60L 50/61 320/119 |

FOREIGN PATENT DOCUMENTS

| | | |
|---|---|---|
| JP | 2004-282800 | 10/2004 |
| JP | 2007-053838 | 3/2007 |
| JP | 2012-005160 | 1/2012 |

* cited by examiner

FIG. 7

| STATE NUMBER | DIAGNOSIS CONTENT | | CAUSE | BATTERY 121 | | | BATTERY 122 | | | CONTACTOR 115 | CONTACTOR 116 |
|---|---|---|---|---|---|---|---|---|---|---|---|
| | NORMAL TIME | ABNORMAL TIME | | DISCHARGE | PRECHARGE | CHARGE | DISCHARGE | PRECHARGE | CHARGE | | |
| 0 | 0V | OTHER THAN ABOUT 0 V | | OFF | OFF | OFF | OFF | OFF | OFF | OFF | OFF |
| 1 | 0V | ABOUT 48 V (OTHER THAN ABOUT 0 V) | (CONTB : ON ABNORMAL) | OFF | ON | OFF | OFF | OFF | OFF | OFF | OFF |
| 2 | 48V | ABOUT 0 V (OTHER THAN ABOUT 48 V) | (CONTB : OFF ABNORMAL) | OFF | ON | OFF | OFF | OFF | OFF | OFF | ON |
| 3 | 0V | OTHER THAN ABOUT 0 V | | OFF | ON | OFF | OFF | OFF | OFF | OFF | OFF |
| 4 | 0V | ABOUT 96 V (OTHER THAN ABOUT 0 V) | (CONTA : ON ABNORMAL) | OFF | ON | OFF | OFF | ON | OFF | OFF | OFF |
| 5 | 96V | ABOUT 0 V (OTHER THAN ABOUT 96 V) | (CONTA : OFF ABNORMAL) | OFF | ON | OFF | OFF | ON | OFF | ON | OFF |
| 6 | 96V | (OTHER THAN ABOUT 96 V) | | ON | ON | ON | ON | ON | ON | ON | OFF |

FIG. 9

ELECTRIC CIRCUIT AND DIAGNOSIS METHOD

TECHNICAL FIELD

The present invention relates to an electric circuit and a diagnosis method.

Priority is claimed on Japanese Patent Application No. 2016-256141, filed Dec. 28, 2016, the content of which is incorporated herein by reference.

BACKGROUND ART

In recent years, technologies for motorizing driving schemes of moving objects have been known (for example, see Patent Literature 1). As described in Patent Literature 1, it is necessary to efficiently charge a storage cell unit included in a moving object and it is also necessary to efficiently obtain motivity from power stored in the storage cell unit. Patent Literature 1 discloses an electric circuit that switches connection by a plurality of switches so that storage cell units (a capacitor group) are in parallel at the time of charging and are in series at the time of discharging.

CITATION LIST

Patent Literature

[Patent Literature 1]
Japanese Unexamined Patent Application, First Publication No. 2004-282800

SUMMARY OF INVENTION

Technical Problem

However, in the electric circuit disclosed in Patent Literature 1, many switches that appropriately switch a plurality of storage cell units are necessary, and thus a complicated configuration is formed.

An aspect of the present invention is achieved in consideration of such circumstances and one object of the present invention is to provide an electric circuit and a diagnosis method capable of using power stored in a plurality of storage cell units in a simpler configuration.

Solution to Problem

To solve the above-described problem and achieve the related object, the following aspects are adopted in the present invention.

(1) According to an aspect of the present invention, there is provided an electric circuit (110) that switches connection among a plurality of storage cell units (120) including a first storage cell unit (121) and a second storage cell unit (122), a load (130) of the plurality of storage cell units, and a power supply (150) supplying power to the plurality of storage cell units. The electric circuit includes: a first rectifier (111) configured to rectify a current flowing between a first pole terminal (150P) of the power supply and a first pole terminal (121P) of the first storage cell unit with homopolarity with the first pole terminal of the power supply; a second rectifier (112) configured to rectify a current being different from the current and flowing between the first pole terminal of the power supply and a first pole terminal (122P) of the second storage cell unit with homopolarity with the first pole terminal of the power supply; and a connection switching device (115, 116) configured to connect the plurality of storage cell units in series between the first pole terminal of the first storage cell unit and the first pole terminal of the second storage cell unit and release the series connection of the plurality of storage cell units during a period in which the power supply supplies power to the plurality of storage cell units.

(2) In the aspect of the foregoing (1), both ends of a pair of the plurality of storage cell units connected in series may be connected to the load. The connection switching device may perform switching to connect the plurality of storage cell units in series.

(3) In the aspect of the foregoing (1) or (2), the connection switching device may perform switching to release the series connection and connect the plurality of storage cell units in parallel to the power supply.

(4) In any one of the aspects of the foregoing (1) to (3), the connection switching device may include a first contactor (115) configured to switch connection and non-connection between a second pole terminal with heteropolarity with the first pole terminal of the first storage cell unit and the first pole terminal of the second storage cell unit, and a second contactor (116) configured to switch connection and non-connection between the second pole terminal of the first storage cell unit and a second pole terminal with heteropolarity with the first pole terminal of the second storage cell unit.

(5) In the aspect of the foregoing (4), when the first contactor is in a conductive state and the second contactor is in a cutoff state, power may be supplied from the first storage cell unit and the second storage cell unit to the load.

(6) In the aspect of the foregoing (4) or (5), when the first contactor is in the cutoff state and the second contactor is in the conductive state, power may be supplied from the power supply to the first storage cell unit and the second storage cell unit.

(7) In any one of the aspects of the foregoing (4) to (6), the electric circuit may further include a control unit (140) configured to switch between a first connection mode in which the first storage cell unit and the second storage cell unit are connected in parallel and a second connection mode in which a third storage cell unit is connected in parallel to both ends of a pair of the first storage cell unit and the second storage cell unit connected in series.

(8) In the aspect of the foregoing (7), the third storage cell unit (133) may be equipped in the load. The connection switching device may be able to electrically connect the first storage cell unit and the third storage cell unit in parallel. The control unit may switch among the first connection mode, the second connection mode, and a third connection mode in which the first storage cell unit and the third storage cell unit are electrically connected in parallel.

(9) In the aspect of the foregoing (8), the control unit may control the first contactor to be in the cutoff state and control the second contactor to be in the conductive state in the first connection mode. The control unit may control the first contactor to be in the conductive state and control the second contactor to be in the cutoff state in the second connection mode.

(10) In any one of the aspects of the foregoing (1) to (9), the electric circuit may further include a first bidirectional switch configured to cut a charging or discharging current of the first storage cell unit; and a second bidirectional switch configured to cut a charging or discharging current of the second storage cell unit.

(11) In any one of the aspects of the foregoing (1) to (10), the first storage cell unit and the second storage cell unit may be provided in a moving object (1) including the load and may be supplied with electricity by a power supply provided outside of the moving object.

(12) In the aspect of the foregoing (11), an accommodation unit (120C) accommodating each of the first storage cell unit and the second storage cell unit may be provided in the moving object. The first storage cell unit and the second storage cell unit may be accommodated in the accommodation unit to be easily detachably mounted.

(13) In any one of the aspects of the foregoing (4) to (9), the electric circuit may further include a first conductor (171) configured to electrically connect the first pole terminal of the first storage cell unit to the first pole terminal of the power supply via the first rectifier; and a second conductor (172) configured to electrically connect a first branch point (P1) provided in the first conductor to the first pole terminal of the second storage cell unit via the second rectifier.

(14) In the aspect of the foregoing (13), the electric circuit may further include a third conductor (173) configured to electrically connect a second branch point (P2), provided in the second conductor to be closer to the first pole terminal of the second storage cell unit than the second rectifier, to the second pole terminal of the first storage cell unit; and a fourth conductor (174) configured to electrically connect a third branch point provided in the third conductor to a second pole terminal with heteropolarity with the first pole terminal of the power supply. The first contactor may be interposed to be closer to the second branch point than the third branch point in the third conductor or closer to the second storage cell unit than the second branch point of the second conductor. The second contractor may be interposed in the fourth conductor.

(15) In any one of the aspects of the foregoing (1) to (14), the polarity of the first pole terminal of the power supply may be positive polarity. The first rectifier may cause a current to flow in a direction oriented from the first pole terminal of the power supply to the first pole terminal of the first storage cell unit. The second rectifier may cause a current to flow in a direction oriented from the first pole terminal of the power supply to the first pole terminal of the second storage cell unit.

(16) According to another aspect of the present invention, there is provided a diagnosis method for an electric circuit that switches connection among a plurality of storage cell units including a first storage cell unit and a second storage cell unit, a load of the plurality of storage cell units, and a power supply supplying power to the plurality of storage cell units. The electric circuit includes a first rectifier configured to rectify a current flowing between a first pole terminal of the power supply and a first pole terminal of the first storage cell unit with homopolarity with the first pole terminal of the power supply, a second rectifier configured to rectify a current being different from the current and flowing between the first pole terminal of the power supply and a first pole terminal of the second storage cell unit with homopolarity with the first pole terminal of the power supply, and a connection switching device configured to connect the plurality of storage cell units in series between the first pole terminal of the first storage cell unit and the first pole terminal of the second storage cell unit and release the series connection of the plurality of storage cell units during a period in which the power supply supplies power to the plurality of storage cell units. The connection switching device includes a first contactor configured to switch connection and non-connection between a second pole terminal with heteropolarity with the first pole terminal of the first storage cell unit and the first pole terminal of the second storage cell unit, and a second contactor configured to switch connection and non-connection between the second pole terminal of the first storage cell unit and a second pole terminal with heteropolarity with the first pole terminal of the second storage cell unit. The diagnosis method includes: performing a first diagnosis mode in which the first contactor is set to a cutoff state, the second contactor is set to a conductive state, and a voltage of a capacitor equipped in the load is determined; and performing a second diagnosis mode in which the first contactor is set to the conductive state, the second contactor is set to the cutoff state, and a voltage of a capacitor equipped in the load is determined, after the first diagnosis mode.

(17) The aspect of the foregoing (16) may further include determining presence or absence of a failure of the second contactor from a result of determination in the first diagnosis mode.

(18) The aspect of the foregoing (16) or (17) may further include determining presence or absence of a failure of the first contactor from a result of determination in the second diagnosis mode.

Advantageous Effects of Invention

According to the aspects of the present invention, there is provided an electric circuit that switches connection among a plurality of storage cell units including a first storage cell unit and a second storage cell unit, a load of the plurality of storage cell units, and a power supply supplying power to the plurality of storage cell units. The electric circuit includes: a first rectifier configured to rectify a current flowing between a first pole terminal of the power supply and a first pole terminal of the first storage cell unit with homopolarity with the first pole terminal of the power supply; a second rectifier configured to rectify a current being different from the current and flowing between the first pole terminal of the power supply and a first pole terminal of the second storage cell unit with homopolarity with the first pole terminal of the power supply; and a connection switching device configured to connect the plurality of storage cell units in series between the first pole terminal of the first storage cell unit and the first pole terminal of the second storage cell unit and release the series connection of the plurality of storage cell units during a period in which the power supply supplies power to the plurality of storage cell units. It is possible to provide the electric circuit and the diagnosis method capable of using power stored in the plurality of storage cell units in a simpler configuration.

BRIEF DESCRIPTION OF DRAWINGS

FIG. 7 is a diagram for describing details of a diagnosis process by an ECU 140 according to the embodiment.

FIG. 9 is a block diagram showing a schematic configuration of a control system controlling travel of the electric motorcycle 1 according to a third embodiment.

DESCRIPTION OF EMBODIMENTS

First Embodiment

Hereinafter, embodiments of the present invention will be described with reference to the drawings. It is assumed that the drawings are ascertained in directions of reference signs and right, left, front, and rear directions are directions in which the reference signs are viewed by a driver.

Figure 1:
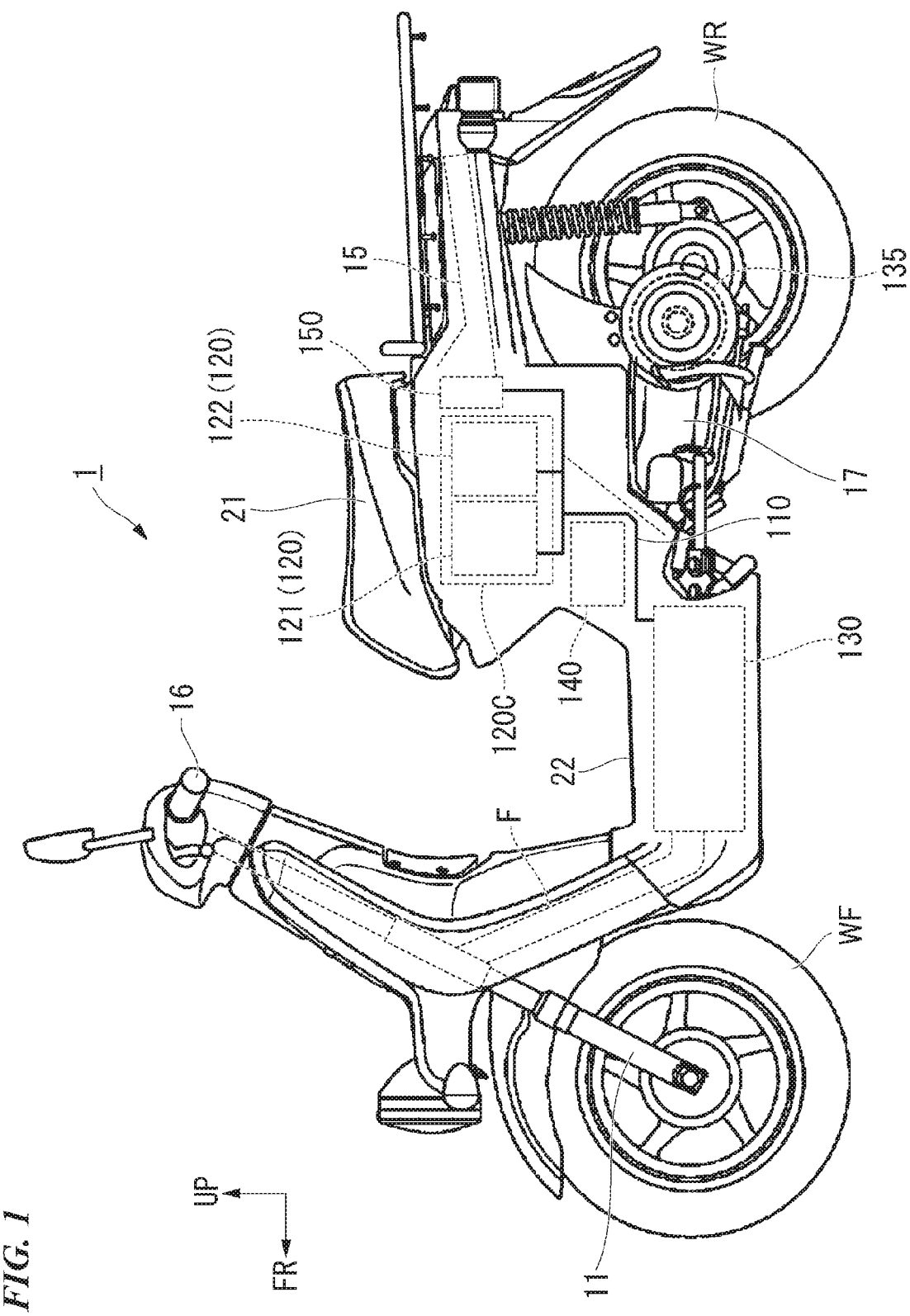
FIG. 1 is a diagram showing an example of a saddle type electric vehicle to which an electric circuit is applied according to a first embodiment.

FIG. 1 is a diagram showing an example of a saddle type electric vehicle to which an electric circuit according to an embodiment is applied. FIG. 1 shows an example of a scooter saddle type electric vehicle with a low floor (hereinafter referred to as an "electric motorcycle"). The electric motorcycle 1 showed in FIG. 1 is an example of a moving object. A body frame F of the electric motorcycle 1 supports a front fork 11 so that front fork 11 can be steered. A front wheel WF is shaft-supported at the lower end of the front fork 11 and a steering handle 16 is connected to an upper portion of the front fork 11.

A front end portion of a swing arm 17 is supported to be pivoted in a rear portion of the body frame F.

An electric motor 135 is provided in a rear end portion of the swing arm 17 and a rear wheel WR is rotatably driven with power output by the electric motor 135.

A pair of right and left seat frames 15 are provided to be connected to a rear portion of the body frame F. A boarding seat 21 is supported by the seat frames 15. A body cover 22 made of a synthetic resin covering the body frame F is fitted in the body frame F.

FIG. 1 shows a disposition example of some electric components. For example, a battery accommodation unit 120C made of a synthetic resin is provided below the boarding seat 21 and between the pair of right and left seat frames 15. A battery 120 is detachably accommodated in the battery accommodation unit 120C.

The electric motorcycle 1 travels by the electric motor 135 provided in the swing arm 17 being driven by a PDU 130 with power supplied via an electric circuit 110 from the battery 120 and rotational power at the time of driving by the electric motor 135 being delivered to the rear wheel WR. For example, the battery 120 according to the embodiment is partitioned into a plurality of battery units such as batteries 121, 122, and the like. For example, the travel of the electric motorcycle 1 is controlled by an electric control unit (ECU) 140 or the like disposed in a proper place such as the inside of the body cover 22 or the like. A charger 150 converts power supplied from the outside and charges the battery 120 via the electric circuit 110. The charger 150 may be detachably mounted on the electric motorcycle 1.

Figure 2:
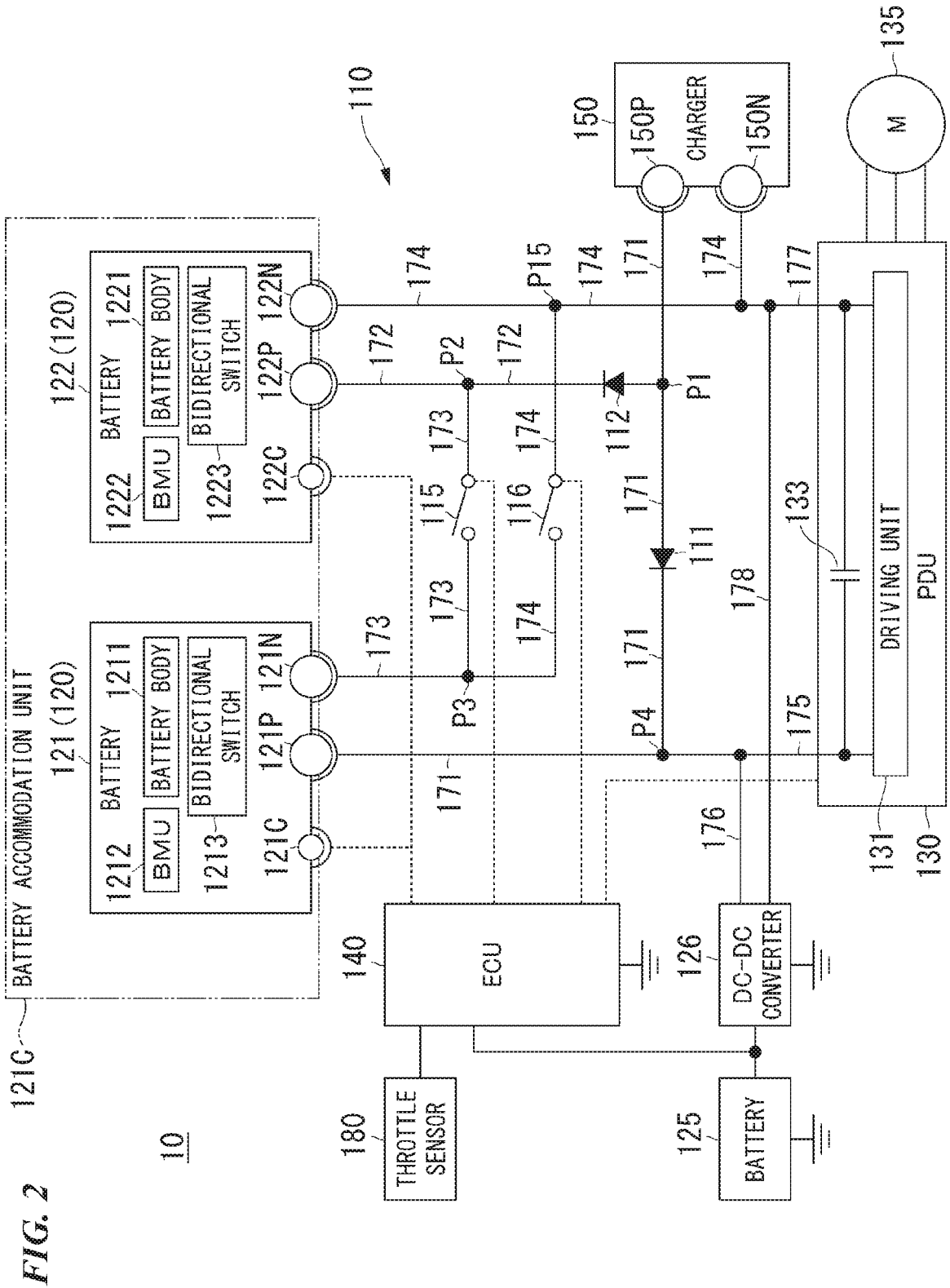
FIG. 2 is a block diagram showing a schematic configuration of a control system controlling travel of an electric motorcycle 1 according to the embodiment.

FIG. 2 is a block diagram showing a schematic configuration of a control system controlling travel of the electric motorcycle 1 according to the embodiment.

A control system 10 includes an electric circuit 110, the battery 120, a PDU 130 (load), the ECU 140 (control unit), and the charger 150 (power supply).

The electric circuit 110 includes a diode 111 (first rectifier), a diode 112 (second rectifier), a contactor 115 (first contactor), a contactor 116 (second contactor), and conductors 171 to 178.

The battery 120 includes, for example, the batteries 121 and 122 which are examples of a plurality of storage cell units. The battery 120 generates a predetermined voltage (for example, a nominal voltage is 48 V) by connecting a plurality of single batteries such as lithium-ion batteries, nickel metal hydride batteries, or lead batteries in series. Power from the batteries 121 and 122 is supplied to the power driver unit (PDU) 130 controlling an output of the electric motor 135 via the electric circuit 110, is converted, for example, from a direct current to a three-phase alternating current by the PDU 130, and is subsequently supplied to the electric motor 135 which is a three-phase AC motor. The PDU 130 is a so-called inverter.

For example, an output voltage of the batteries 121 and 122 is dropped to a low voltage (for example, 12 V) by a DC-DC converter 126 and is supplied to a control system component such as the ECU 140.

For example, an allowable input voltage variation range of the DC-DC converter 126 includes a voltage obtained by connecting the batteries 121 and 122 in series. Further, in the DC-DC converter 126, a variation range of a voltage of each of the batteries 121 and 122 and a variation range of a voltage obtained by connecting the batteries 121 and 122 in series may be included in the allowable input voltage variation range.

For example, an output voltage of the batteries 121 and 122 may be set so that each nominal voltage is allowed to vary, for example, to an upper limit voltage equivalent to 125% of the nominal voltage and to a lower limit voltage equivalent to 90% of the nominal voltage at normal times.

Some of the power of a low voltage dropped by the DC-DC converter 126 is supplied to the battery 125 or a general electric component such as a lighting component (not showed).

The batteries 121 and 122 can be charged by, for example, the charger 150 connected to a power supply of AC 100 V.

The battery 121 according to the embodiment includes a battery body 1211, a battery managing unit (BMU) 1212, a bidirectional switch 1213, a high-potential side terminal 121P (first pole terminal), a low-potential side terminal 121N (second pole terminal), and a connector 121C. Similarly, the battery 122 includes a battery body 1221, a BMU 1222, and a bidirectional switch 1223. In the following description, the BMU 1212 and the BMU 1222 are collectively referred to as a unit BMU. A charging or discharging situation, a storage amount, a temperature, and the like of the batteries 121 and 122 are monitored by each battery BMU and monitoring information regarding the batteries 121 and 122 is shared with the ECU 140. The BMU limits charging and discharging of the battery body 1211 and the like by controlling the bidirectional switch 1213 or the like in accordance with a control instruction from the ECU 140 to be described below or the foregoing monitoring result. The details of the bidirectional switch 1213 will be described below. The BMU 1212 communicates the ECU 140 via the connector 121C. The BMU 1212 of the battery 121 is supplied with control power via the connector 121C. The battery 122 is also similar thereto.

Information regarding an output request from a throttle (accelerator) sensor 180 is input to the ECU 140 and the ECU 140 controls the contactors 115 and 116, the battery 120, the PDU 130, and the like based on the input information regarding the output request. For example, the ECU 140 can regulate the charging and discharging of the battery 120 by controlling the battery 120. The ECU 140 switches supply of the power to the battery 120 and discharging from the battery 120 by controlling the contactors 115 and 116. The ECU 140 controls driving of the electric motor 135 when the PDU 130 controls the power supplied to the electric motor 135. In the block diagram showed in FIG. 2, the charger 150 is also included in the control system 10 controlling travel of the electric motorcycle 1. However, the charger 150 may be configured to be detachably mounted in the electric motorcycle 1. In this case, the charger 150 may be provided outside of the electric motorcycle 1.

The diode 111 rectifies a current flowing between a high-potential side terminal 150P (first pole terminal) of the charger 150 and a high-potential side terminal 121P (first pole terminal) of the battery 121 (first storage cell unit). For example, the diode 111 causes a current to flow in a direction oriented from the high-potential side terminal 150P of the charger 150 to the high-potential side terminal 121P of the battery 121.

The diode 112 rectifies a current flowing between the high-potential side terminal 150P of the charger 150 and a high-potential side terminal 122P (first pole terminal) of the battery 122 (second storage cell unit). For example, the diode 112 causes a current to flow in a direction oriented from the high-potential side terminal 150P of the charger 150 to the high-potential side terminal 122P of the battery 122.

The current flowing in the diode 111 is different from the current flowing in the diode 112. The polarity of each of the high-potential side terminal 150P of the charger 150, the high-potential side terminal 121P of the battery 121, and the high-potential side terminal 122P of the battery 122 is the same polarity and is, for example, positive polarity in the embodiment.

The diode 111 corresponding to the battery 121 and the diode 112 corresponding to the battery 122 are provided to protect each unit from the following events.

The diodes 111 and 112 are provided to prevent the current from flowing backward from each of the high-potential side terminal 121P of the battery 121 and the high-potential side terminal 122P of the battery 122 to the high-potential side terminal 150P of the charger 150.

The diode 111 is provided to prevent the battery 121 from being short-circuited when the batteries 120 are connected in series.

By providing the diodes 111 and 112 conversely in conductors 171 and 172 connecting the high-potential side terminal 121P of the battery 121 to the high-potential side terminal 122P of the battery 122, when one battery is short-circuited and fails, the other battery is prevented from being short-circuited.

The contactor 115 (first contactor) switches between connection and non-connection of the low-potential side terminal 121N of the battery 121 and the high-potential side terminal 122P of the battery 122. For example, the contactor 115 is provided between the high-potential side terminal 121P of the battery 121 and the high-potential side terminal 122P of the battery 122, that is, between the low-potential side terminal 121N of the battery 121 and the high-potential side terminal 122P of the battery 122. The contactor 115 connects the batteries 120 in series in a conductive state and releases the series connection of the batteries 120 in a cutoff state. A period in which the contactor 115 is in the cutoff state includes at least a period in which the charger 150 supplies power to the battery 120.

The contactor 116 (second contactor) switches between connection and non-connection of the low-potential side terminal 121N of the battery 121 and the low-potential side terminal 122N of the battery 122. For example, the contactor 116 connects the low-potential side terminal 121N of the battery 121 to the low-potential side terminal 122N of the battery 122 in the conductive state. A period in which the contactor 116 is in the conductive state includes at least a period in which the charger 150 supplies power to the batteries 120.

Both ends of the batteries 120 connected in series are connected to the PDU 130. The batteries 121 and 122 in the batteries 120 are connected in series or connected in parallel in accordance with switching of the state of the contactors 115 and 116. The contactors 115 and 116 and the diodes 111 and 112 are examples of a connection switching device.

[Example of Connection Configuration of Driving System of Electric Circuit]

Each unit of the driving system of the electric circuit 110 is electrically connected as follows by conductors (conducting wires) including the conductor 171 (first conductor), the conductor 172 (second conductor), a conductor 173 (third conductor), a conductor 174 (fourth conductor), a conductor 175, a conductor 176, a conductor 177, and a conductor 178.

The conductor 171 electrically connects the high-potential side terminal 121P of the battery 121 to the high-potential side terminal 150P of the charger 150. The diode 111 is inserted into the conductor 171. For example, a cathode of the diode 111 is connected to the high-potential side terminal 121P of the battery 121 and an anode of the diode 111 is connected to the high-potential side terminal 150P of the charger 150. A branch point P1 (first branch point) is provided between the anode of the diode 111 and the high-potential side terminal 150P of the charger 150.

The conductor 172 electrically connects the branch point P1 to the high-potential side terminal 122P of the battery 122. The diode 112 is inserted into the conductor 172. For example, a cathode of the diode 112 is connected to the high-potential side terminal 122P of the battery 122 and an anode of the diode 112 is connected to the high-potential side terminal 150P of the charger 150 via the branch point P1. A branch point P2 (second branch point) is provided between the cathode of the diode 112 and the high-potential side terminal 121P of the battery 121.

The conductor 173 electrically connects the branch point P2 to the low-potential side terminal 121N of the battery 121. A contact point of the contactor 115 is inserted into the conductor 173. A branch point P3 (third branch point) is provided in the conductor 173. The position of the branch point P3 is between the contactor 115 and the low-potential side terminal 121N of the battery 121.

The conductor 174 electrically connects the branch point P3 to the low-potential side terminal 150N of the charger 150. A contact point of the contactor 116 is inserted into the conductor 174.

The conductor 174 electrically connects the low-potential side terminal (122N) of the battery (122) on a lower potential side among the batteries connected in series to the low-potential side terminal 150N of the charger 150.

A branch point P4 (fourth branch point) is provided between the cathode of the diode 111 to the high-potential side terminal 121P of the battery 121. The conductor 175 electrically connects the branch point P4 to the high-potential side terminal 130P of the PDU 130. The conductor 176 electrically connects the branch point P4 to the high-potential side terminal 126P of the DC-DC converter 126. The conductor 177 connects the low-potential side terminal 130N of the PDU 130 to the low-potential side terminal 150N of the charger 150. The conductor 178 connects the low-potential side terminal 126N of the DC-DC converter 126 to the low-potential side terminal 150N of the charger 150.

The electric circuit 110 may include connection of a monitoring control system indicated by a dotted line in FIG. 2 in addition to the connection of the foregoing driving system. The electric circuit 110 may include the ECU 140.

[Operation of Electric Circuit]

The ECU 140 acquires a state of the battery 120 from the BMU of the battery 120. The ECU 140 detects a manipulation by a user from the throttle sensor 180 or the like. The ECU 140 controls the contactor 115, the contactor 116, and the PDU 130 based on the collected information.

Process of Charging Battery 120 with Power from Charger 150:

When the battery 120 is charged with power from the charger 150, the ECU 140 sets the contactor 115 to the cutoff state and sets the contactor 116 to the conductive state. That is, when the batteries 121 and 122 are in a parallel connection state, power from the charger 150 is supplied to the batteries 121 and 122. In the case of the foregoing control state, a state in which power from the charger 150 can be supplied to the PDU 130 is achieved, but a voltage of the power is the same as a voltage applied between terminals of the battery 121.

Process of Driving PDU 130 with Power Stored in Battery 120:

When the PDU 130 is driven with power stored in the battery 120, the ECU 140 sets the contacts 115 to the conductive state and sets the contactor 116 to the cutoff state. That is, when the batteries 121 and 122 are in a series connection state, the batteries 121 and 122 supply power to the PDU 130. In the foregoing case, the diode 111 is reversely biased and a voltage (for example, 96 V) of the high-potential side terminal 121P of the battery 121 is not applied to the high-potential side terminal 122P of the battery 122 and the high-potential side terminal 150P of the charger 150.

Process of Reducing Rush Current at time of Initiation

As showed in FIG. 1 described above, in the PDU 130, a capacitor 133 is provided between input terminals of the power supply in some cases. The capacitor 133 is in a state in which the power is supplied to the PDU 130 and charged. When the supply of the power to the PDU 130 is stopped, the power is discharged and the voltage between the terminals of the capacitor 133 becomes 0 V. Therefore, when the supply of the power to the PDU 130 is started, such as at the time of initiation of the electric motorcycle 1, charging of a voltage between the terminals of the capacitor 133 starts from 0 V.

In particular, when charging starts in the state in which the batteries 121 and 122 are connected in series, a larger rush current is generated as a voltage to be applied is higher.

Accordingly, the control system 10 according to the embodiment performs a process of reducing a rush current generated at that time before supply of power from the batteries 121 and 122 to the PDU 130 starts.

Figure 3:
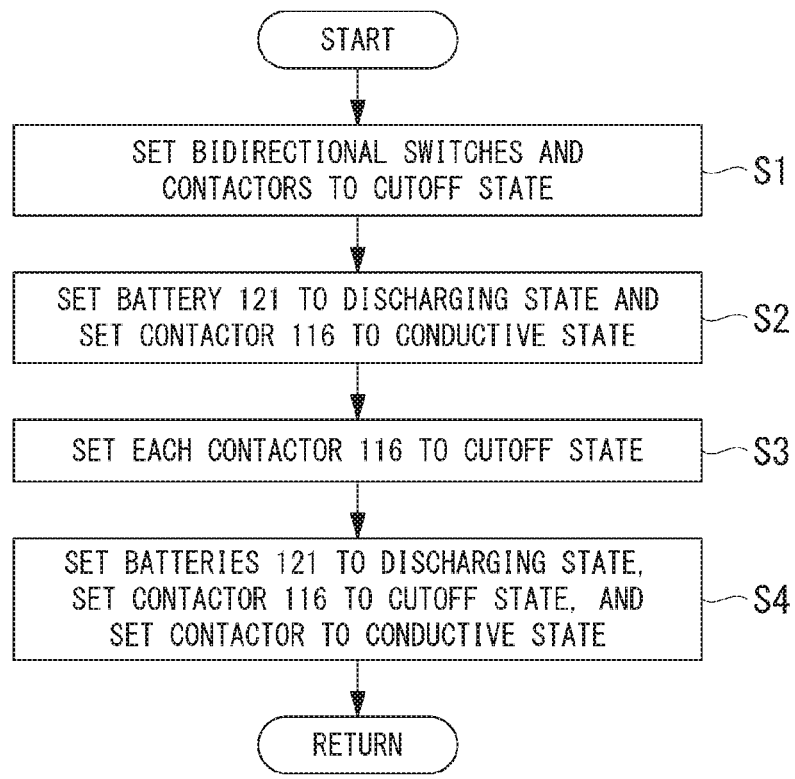
FIG. 3 is a flowchart showing a process of reducing a rush current according to the embodiment.

FIG. 3 is a flowchart showing a process of reducing a rush current according to the embodiment.

For example, the ECU 140 raises a voltage step by step separately a plurality of times as follows when supply of power to the PDU 130 starts. For example, an example in which the number of times is two will be described below.

First, the ECU 140 sets the bidirectional switches 1213 and 1223 in the battery 120 and the contactors 115 and 116 to the cutoff state (S1) and stops charging or discharging the battery 120.

This process may be performed in a step in which the electric motor 135 is stopped or a step in which the charging or discharging of the battery 120 is first stopped.

Subsequently, the ECU 140 sets the battery 121 to a discharging state and sets the contactor 116 to the conductive state to start first charging of the capacitor 133, with the contactor 115 being in the cutoff state (S2). Thus, a PDU power supply side terminal, that is, the capacitor 133, is charged with 48 V.

Subsequently, the ECU 140 sets each contactor to the cutoff state temporarily to avoid short-circuit or the like (S3).

Subsequently, the ECU 140 maintains the cutoff state of the contactor 116 and sets the contactor 115 to the conductive state to start second charging before the voltage of the capacitor 133 considerably decreases (S4). Thus, the PDU power side terminal, that is, the capacitor 133, is charged with 96 V.

As described above, the ECU 140 can separately raise a voltage applied to the PDU 130 step by step twice when the supply of the power to the PDU 130 is started.

According to the foregoing embodiment, the electric circuit 110 switches connection among the batteries 120 including the batteries 121 and 122, the PDU 130 which is a load of the batteries 120, and the charger 150 supplying power to each of the batteries 120 connected in parallel. The diode 111 in the electric circuit 110 rectifies a current to flow the current in a direction oriented from the high-potential side terminal 150P of the charger 150 to the high-potential side terminal 121P of the battery 121. The diode 112 rectifies a current to flow the current in a direction oriented from the high-potential side terminal 150P of the charger 150 to the high-potential side terminal 122P of the battery 122. The state of the contactors 115 and 116 is switched to connect the batteries 121 and 122 in series between the first pole terminal of the battery 121 and each of the first pole terminal and the second pole terminal of the battery 122 and release the series connection of the batteries 121 and 122 during a period in which the charger 150 supplies the power to the batteries 120.

In this way, the diodes 111 and 112 corresponding to the batteries 121 and 122 are provided, and thus the electric circuit 110 limits short-circuiting of the batteries 120 when the batteries 120 are connected in series. Thus, the electric circuit 110 can be configured more simply, and the power stored in the batteries 121 and 122 can be used.

Further, the electric circuit 110 can reduce the number of mechanical switches which can switch between parallel connection at the time of charging and to series connection at the time of discharging, compared to the above-described comparison example. In the mechanical switches, contact points are welded, which is a cause of failures. However, since the number of mechanical switches is reduced using the diodes according to the embodiment, it is possible to reduce an occurrence probability of failures.

In a path connecting the high-potential side terminal 121P of the battery 121 to the high-potential side terminal 122P of the battery 122, the diodes 111 and 112 are connected in mutually reverse directions, thereby preventing short-circuiting.

The batteries 120 may not be included in the electric circuit 110. A battery appropriate for the electric circuit 110 may be combined with the electric circuit 110.

The polarity of the high-potential side terminal 150P (first pole terminal) of the charger 150 is positive. The diode 111 causes a current to flow in a direction oriented from the high-potential side terminal 150P of the charger 150 to the high-potential side terminal 121P of the battery 121. The diode 112 causes a current to flow in a direction oriented from the high-potential side terminal 150P of the charger 150 to the high-potential side terminal 122P of the battery 122. Thus, a negative side in the electric circuit 110 can be configured to be at a common potential.

Both ends of the battery 120 are connected to the PDU 130. The batteries 120 in which the batteries 121 and 122 are connected in series can supply power to the PDU 130 through switching of the state of the contactors 115 and 116.

When the contactors 115 and 116 connect the batteries 120 to the charger 150, the series connection of the batteries 120 is released and the batteries 120 are connected to the charger 150 in parallel with each other. Thus, two contactors, the contactors 115 and 116, are used so that the series connection and the parallel connection of the batteries 121 and 122 can be switched.

The contactor 115 switches between connection and non-connection between the low-potential side terminal of the battery 121 and the high-potential side terminal 121P of the battery 122. The contactor 116 switches between connection and non-connection between the low-potential side terminal of the battery 121 and the low-potential side terminal 121P of the battery 122. Thus, the contact 115 can connect the batteries 121 and 122 in series and the contactor 116 can connect them in parallel.

The batteries 121 and 122 can supply the power to the PDU 130 when the contactor 115 is in the conductive state and the contactor 116 is in the cutoff state.

When the charger 150 is connected to the electric circuit 110 and thus the contactor 115 is in the cutoff state and the contactor 116 is in the conductive state, power from the charger 150 is supplied to the batteries 121 and 122.

The ECU 140 switches between a first connection mode in which the batteries 121 and 122 are connected in parallel and a second connection mode in which the batteries 121 and 122 are connected in series and the capacitor 133 is connected in parallel to both ends of the pair of batteries connected in series. Thus, the batteries 121 and 122 can be charged in the first connection mode and power can be discharged from the batteries 121 and 122 in the second connection mode.

The electric circuit 110 can supply charges from the batteries 121 and 122 to the capacitor 133. The contactor 116 can electrically connect the battery 121 to the capacitor 133 in parallel. The ECU 140 switches among the first connection mode, the second connection mode, and a third connection mode in which the battery 121 and the capacitor 133 are electrically connected in parallel. Thus, the capacitor 133 can be charged step by step and a rush current at the time of start of charging can be reduced.

The ECU 140 controls the contactor 115 to the cutoff state and controls the contactor 116 to the conductive state in the first connection mode. The ECU 140 controls the contactor 115 to the conductive state and controls the contactor 116 to the cutoff state in the second connection mode. Thus, the ECU 140 can control the conductive state of the contactors 115 and 116 to switch between charging to the batteries 120 and discharging from the batteries 120.

The battery 121, the battery 122, and the PDU 130 are provided in the electric motorcycle 1 common to each other and are supplied with electricity by the charger 150 provided outside of the electric motorcycle 1. For example, the electric circuit 110 includes a power supply connection terminal unit to which the detachably mounted charger 150 is connected. By releasing connection with the charger 150 via a connection portion with the charger 150 in the power supply connection terminal unit, it is possible to separate the charger 150 from the electric motorcycle 1.

A battery accommodation unit that accommodates the batteries 121 and 122 is provided in the electric motorcycle 1. The batteries 121 and 122 are accommodated in the battery accommodation unit to be easily detachably mounted. Thus, the batteries 121 and 122 can be easily detachably mounted.

The conductor 171 electrically connects the high-potential side terminal 121P of the battery 121 to the high-potential side terminal 150P of the charger 150 via the diode 111. The branch point P1 is provided in the conductor 171. The conductor 172 electrically connects the branch point P1 to the high-potential side terminal 122P of the battery 122 via the diode 112. Thus, the diodes 111 and 112 can rectify a current in a direction oriented from the branch point P1 to the batteries 121 and 122.

The branch point P2 is provided in the conductor 172 to be closer to the high-potential side terminal 122P of the battery 122 than the diode 112, and the conductor 173 electrically connects the branch point P2 to the low-potential side terminal 121N of the battery 121. The branch point P3 is provided in the conductor 173. The conductor 174 electrically connects the branch point P3 to the low-potential side terminal 150N of the charger 150. The contactor 115 is interposed to be closer to the branch point P2 than the branch point P3 in the conductor 173. The contactor 116 is interposed in the conductor 174. Thus, the two contactors are used so that the batteries 121 and 122 can be connected in parallel at the time of charging and can be connected in series at the time of discharging.

Second Embodiment

A second embodiment will be described. In the first embodiment, the example in which a rush current is reduced by switching connection of the batteries 121 and 122 step by step has been described. The embodiment relates to an example in which a rush current is further reduced when the PDU 130 is charged and a state of the electric circuit 110 is diagnosed.

As showed in FIG. 2 described above, the control system 10 that controls travel of the electric motorcycle 1 according to the embodiment includes the electric circuit 110, the batteries 120, the PDU 130, the ECU 140 and the charger 150. The batteries 120 include, for example, the batteries 121 and 122 as in the first embodiment.

Figure 4:
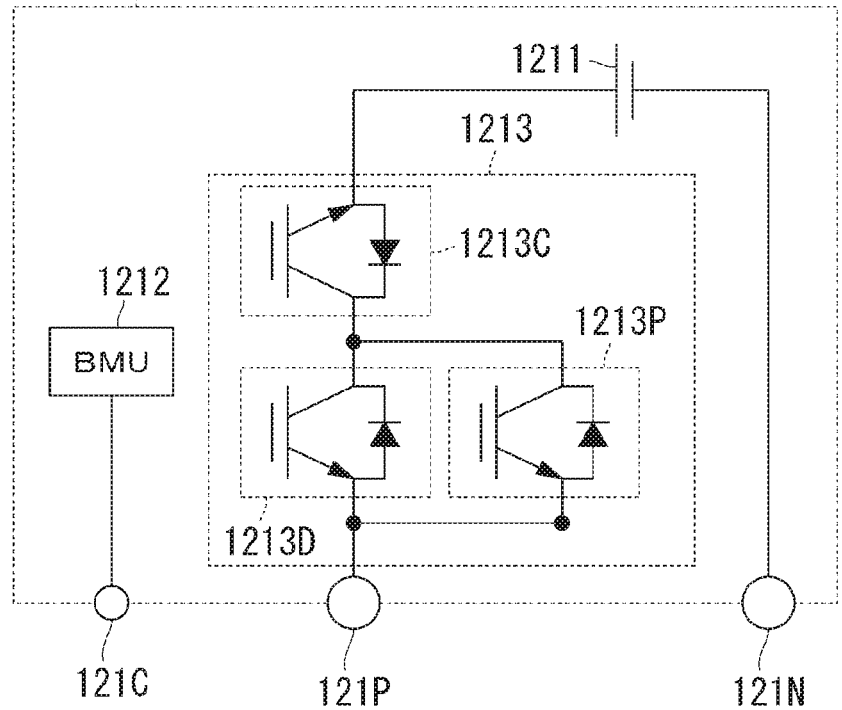
FIG. 4 is a diagram for describing an example of a battery according to a second embodiment.

FIG. 4 is a diagram for describing an example of a battery 121 according to the embodiment.

The battery 121 according to the embodiment includes a battery body 1211, a BMU 1212, and a bidirectional switch 1213 (first bidirectional switch). The battery 122 according to the embodiment has a similar configuration as the battery 121. That is, the battery 122 includes a battery body 1221, a BMU 1222, and a bidirectional switch 1223 (second bidirectional switch).

The bidirectional switch 1213 according to the embodiment includes a switch 1213C, a switch 1213D, and a switch 1213P.

The switch 1213C includes a semiconductor switch and a diode that causes a current to flow in a direction reverse to the direction of a current flowing in the semiconductor switch. The switch 1213C is controlled to a conductive state when the battery body 1211 is charged and causes a current to flow from the outside of the battery 121 to the battery body 1211.

The switch 1213D includes a semiconductor switch and a diode that causes a current to flow in a direction reverse to the direction of a current flowing in the semiconductor switch. The switch 1213D is controlled to a conductive state when the battery body 1211 is discharged and causes a current to flow from the battery body 1211 to the outside of the battery 121.

The switch 1213P includes a semiconductor switch and a diode that causes a current to flow in a direction reverse to the direction of a current flowing in the semiconductor switch. The switch 1213P is controlled to a conductive state when the capacitor 133 or the like of the PDU 130 is charged in advance (precharged) by discharging from the battery body 1211 so that a current oriented to the outside of the battery 121 from the battery body 1211 flows. For example, the switch 1213P is connected in parallel to the switch 1213D. The current caused to flow by the switch 1213P is adjusted to be less than the current caused to flow by the switch 1213D, and thus a rush current at the time of charging of the capacitor 133 of the PDU 130 can be limited.

The bidirectional switch 1213 cuts a charging or discharging current of the battery 121. The bidirectional switch 1223 cuts a charging or discharging current of the battery 122.

In the embodiment, the ECU 140 performs a process of reducing a rush current at the time of initiation or the like and a process of detecting a failure in parallel among a series of processes. The details of each process will be described below.

Process of Reducing Rush Current at the Time of Initiation or the Like

As showed in FIG. 1 described above, in the PDU 130, the capacitor 133 is provided between terminals on a power supply input side in some cases. When supply of power to the PDU 130 starts, charging starts from 0 V of a voltage between the terminals of the capacitor 133. Therefore, it is necessary to suppress a rush current.

Accordingly, in the electric circuit 110 according to the embodiment, the ECU 140 controls the bidirectional switches of the batteries 121 and 122 and external contactors before the supply of power from the batteries 121 and 122 to the PDU 130, thereby reducing the rush current.

For example, when the ECU 140 starts supplying power to the PDU 130, the voltage is configured to be gradually raised separately a plurality of times as follows. For example, an example in which the number of times the voltage is raised is set to two and a charging current is further adjusted to reduce the rush current will be described.

Process of Detecting Failure

To improve reliability when the electric circuit 110 according to the embodiment is used, a switch state of each unit included in the electric circuit 110 is diagnosed. For example, the ECU 140 controls conductive states of the bidirectional switch of each battery and the contactors 115 and 116 at the time of initiation of a vehicle and diagnoses whether there is a failure in each semiconductor switch of the foregoing bidirectional switches and each contactor, the contactors 115 and 116. The bidirectional switches of the batteries according to the embodiment are the bidirectional switch 1213 in the battery 121 and the bidirectional switch 1223 in the battery 122.

Figure 5:
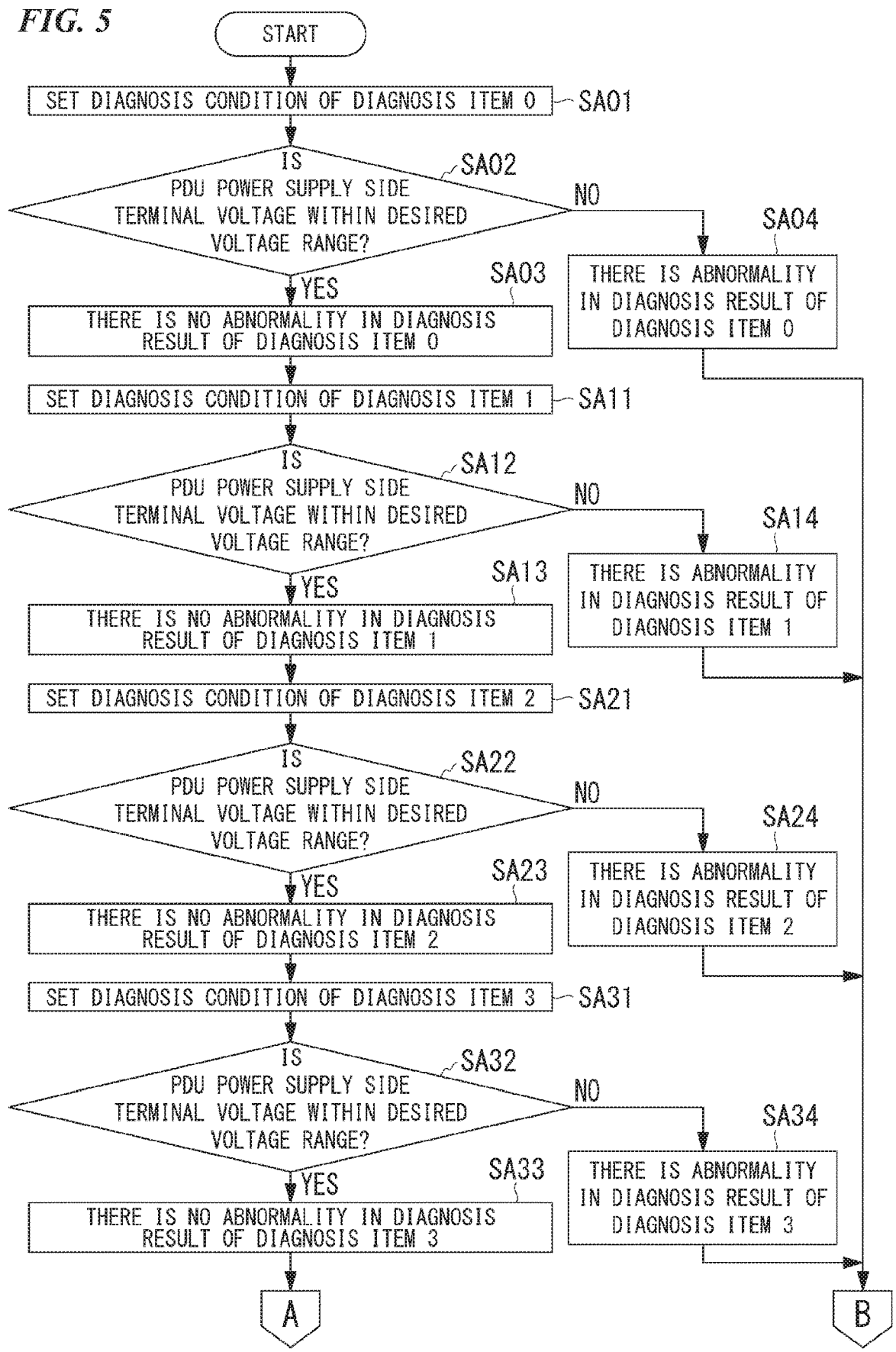
FIG. 5 is a flowchart showing a procedure of a process at the time of driving start in an electric circuit according to the embodiment.
Figure 6:
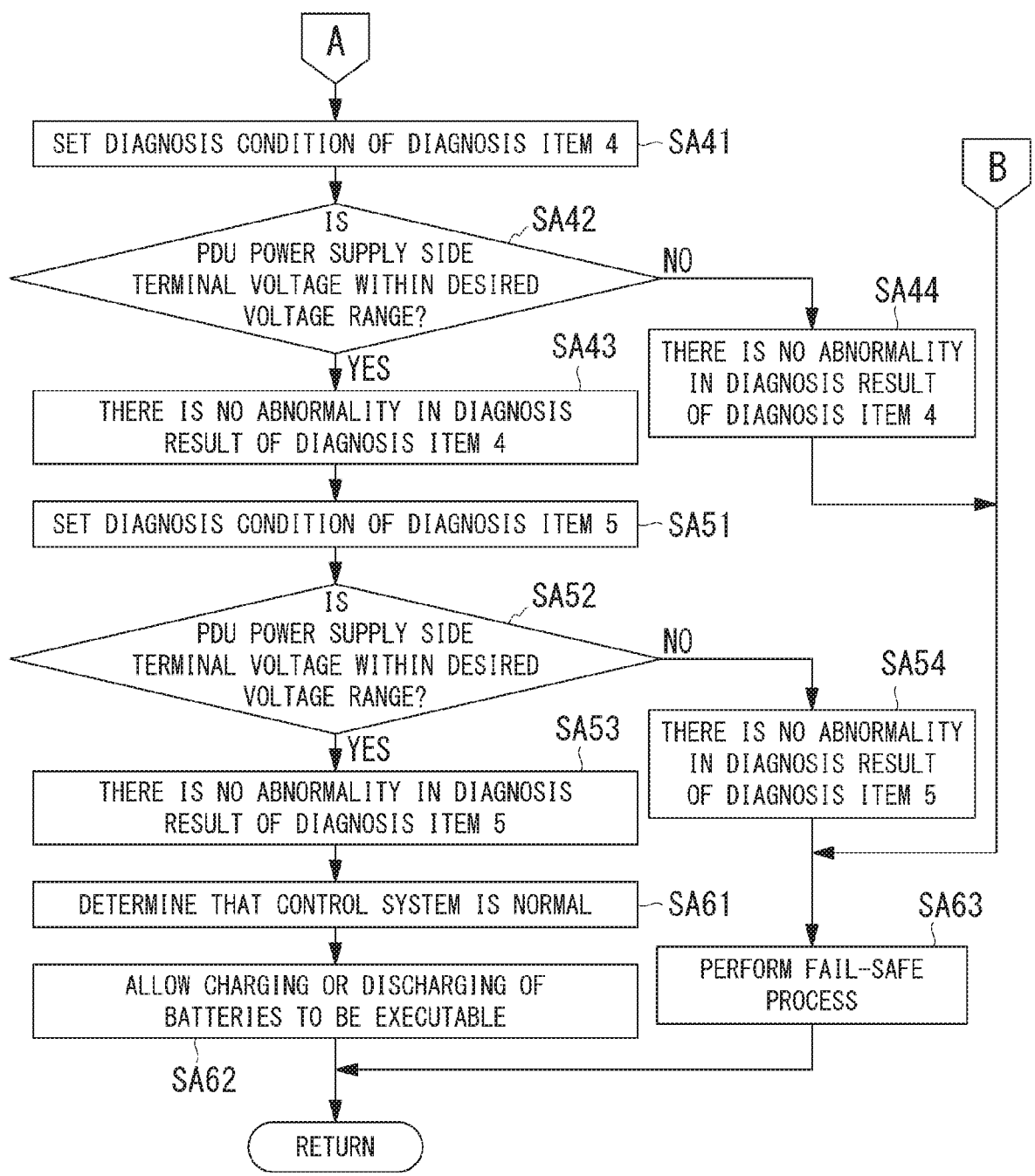
FIG. 6 is a flowchart showing the procedure of the process at the time of driving start in an electric circuit according to the embodiment.

FIGS. 5 and 6 are flowcharts showing a procedure of a process at the time of driving start in the electric circuit according to the embodiment. FIG. 7 is a diagram for describing details of the diagnosis process by the ECU 140 according to the embodiment. In a list showed in FIG. 7, the diagnosis process is divided into a plurality of states, diagnosis content at the time of stepwise diagnosis, causes assumed from abnormal states, and control content for the batteries 121 and 122 and the contactors 115 and 116 are summarized to correspond to diagnosis process states (state numbers).

As showed in FIGS. 5 and 6, the ECU 140 charges the capacitor 133 in the PDU 130 by switching each state from the following State 0 to State 6 in order and performs the foregoing diagnosis by detecting a voltage storage in the capacitor 133 or the like (hereinafter referred to as a PDU power supply side terminal voltage).

State 0:

First, as showed in FIG. 5, the ECU 140 sets a diagnosis condition of Diagnosis Item 0 (SA01) and first performs diagnosis of Diagnosis Item 0 immediately after an initiation operation is detected. The ECU 140 determines whether the PDU power supply side terminal voltage is within a desired voltage range, with the contactors 115 and 116 and the bidirectional switches 1213 and 1223 in the battery 120 being in the cutoff state (OFF) (SA02). An expected value of the PDU power supply side terminal voltage in State 0 is 0 V (volts). The ECU 140 determines that there is no abnormality in the result of the diagnosis when the PDU power supply side terminal voltage is within the desired voltage range (for example, about 0 V) (SA03), and determines that there is abnormality in other cases (SA04).

State 1:

Next, the ECU 140 causes the control state from State 0 to transition State 1 and sets the diagnosis condition of Diagnosis Item 1 (SA11) and performs diagnosis of Diagnosis Item 1. The ECU 140 sets the switch 1213P in the battery 121 to the conductive state (ON) and determines whether the PDU power supply side terminal voltage is within the desired voltage range, with each switch and each contactor excluding the switch 1213P being in the cutoff state (OFF) (SA11). An expected value of the PDU power supply side terminal voltage in State 1 is 0 V. The ECU 140 determines that there is no abnormality in the result of the diagnosis (SA12) when the PDU power supply side terminal voltage is within the desired voltage range (for example, about 0 V), and determines that there is abnormality in other cases (SA13). For example, when a failure occurs with the contact point of the contactor 116 being in the conductive state due to a cause of welding of the contact point of the contactor 116 (ON failure of the contactor 116), the PDU power supply side terminal voltage is detected as a voltage of 48 V or the like.

State 2:

Next, the ECU 140 causes the control state from State 1 to transition State 2, sets the diagnosis condition of Diagnosis Item 2 (SA21), and performs diagnosis of Diagnosis Item 2. The ECU 140 maintains the conductive state of the switch 1213P in the battery 121, sets the contactor 116 to the conductive state (ON), and determines whether the PDU power supply side terminal voltage is within the desired voltage range, with each switch and each contactor excluding the contactor and the switch being in the cutoff state (SA22). An expected value of the PDU power supply side terminal voltage in State 2 is 48 V. The ECU 140 determines that there is no abnormality in the result of the diagnosis (SA23) when the PDU power supply side terminal voltage is mostly 48 V (for example, about 48 V), and determines that there is abnormality in other cases (SA24). Mostly 48 V is a voltage value in a state in which the battery 121 is normally charged and is a voltage in a case in which the voltage value is within an allowable variation range. For example, when a failure occurs with the contact point of the contactor 116 being in the cutoff state due to a cause of no operation of the contact point of the contactor 116 (OFF failure of the contactor 116), the PDU power supply side terminal voltage is detected as a voltage of 0 V or the like.

State 3:

Next, the ECU 140 causes the control state from State 2 to transition State 3, sets the diagnosis condition of Diagnosis Item 3 (SA31), and performs diagnosis of Diagnosis Item 3. The ECU 140 returns the contactor 116 to the cutoff state and determines whether the PDU power supply side terminal voltage is within the desired voltage range, with each of the other switches and contactors including the switch 1213P in the battery 121 being in the cutoff state (SA32). The expected value and the diagnosis content in this state are the same as those in State 1. That is, the ECU 140 determines that there is no abnormality in the result of the diagnosis (SA33) when the PDU power supply side terminal voltage is 0 V, and determines that there is abnormality in other cases (SA34). For example, when welding of the contact point of the contact 115 occurs, the contactor 116 does not return to the cutoff state. Therefore, the PDU power supply side terminal voltage is not mostly 0 V and it is determined that there is abnormality.

State 4:

Next, as showed in FIG. 6, the ECU 140 causes the control state from State 3 to transition State 4, and sets the diagnosis condition of Diagnosis Item 4 (SA41), and performs diagnosis of Diagnosis Item 4. The ECU 140 maintains the switch 1213P in the battery 121 in the conductive state, further sets the switch in the battery 122 to the conductive state, and determines whether the PDU power supply side terminal voltage is within the desired voltage range, with each switch and each contactor excluding the switch 1213P being in the cutoff state (SA42). An expected value of the PDU power supply side terminal voltage in State 4 is 0 V. The ECU 140 determines that there is no abnormality in the result of the diagnosis (SA43) when the PDU power supply side terminal voltage is 0 V, and determines that there is abnormality in other cases (SA44). For example, when a failure occurs with the contact point of the contactor 115 being in the conductive state due to a cause of welding of the contact point of the contactor 115 (ON failure of the contactor 115), the PDU power supply side terminal voltage is detected as a voltage of 96 V or the like.

State 5:

Next, the ECU 140 causes the control state from State 4 to transition State 5, sets the diagnosis condition of Diagnosis Item 5 (SA51), and performs diagnosis of Diagnosis Item 5. The ECU 140 maintains the conductive state of the contactor 116 and the switch 1213P in the battery 121, further sets the switch 1213P in the battery 122 to the conductive state, and determines whether the PDU power supply side terminal voltage is within the desired voltage range, with each switch and each contactor excluding the contactor and the switches being in the cutoff state. An expected value of the PDU power supply side terminal voltage in State 5 is 96 V. The ECU 140 determines that there is no abnormality in the result of the diagnosis when the PDU power supply side terminal voltage is mostly 96 V (about 96 V), and determines that there is abnormality in other cases. Mostly 96 V is a voltage in a case in which a voltage value in the state in which the batteries 121 and 122 are normally charged is within an allowable variation range. For example, when a failure occurs with the contact point of the contactor 115 being in the cutoff state due to a cause of no operation of the contact point of the contactor 115 (OFF failure of the contactor 115), the PDU power supply side terminal voltage is detected as a voltage of 0 V.

State 6:

When abnormality is not detected in any of Diagnosis Item 0 to Diagnosis Item 5 performed in each of the foregoing processes, the ECU 140 determines that the control system 10 normally operates including the electric circuit 110 (SA61) and allows charging or discharging of the batteries 121 and 122 to be executable (SA62). That is, the ECU 140 sets each switch, the bidirectional switch 1213 of the battery 121 and the bidirectional switch 1223 of the battery 122, to the conductive state, and then ends the series of processes showed in the drawings.

After any process ends among SA04, SA14, SA24, SA34, SA44, and SA54, the ECU 140 determines that there is abnormality in the diagnosis result of the diagnosis item of any process and performs a predetermined fail-safe process (SA62). After the ECU 140 ends the process, the ECU 140 ends the series of processes showed in the drawings.

The diagnosis items, the control states, the procedure of the diagnosis process, and the like are exemplary and may be modified in accordance with an object without being limited thereto.

According to the embodiment, similar advantageous effects to those of the first embodiment can be obtained and the following diagnosis can also be performed. For example, the ECU 140 determines a voltage in the capacitor 133 when the contactor 115 is in the cutoff state and the contactor 116 is in the conductive state (a first diagnosis mode). The ECU 140 determines a voltage in the capacitor 133 when the contactor 115 is in the conductive state and the contactor 116 is in the cutoff state after the first diagnosis mode (a second diagnosis mode). Thus, it is possible to diagnose the state of the electric circuit 110 including operational situations of the contactors 115 and 116 based on the voltage in the capacitor 133.

The ECU 140 can determine whether there is a failure of the contactor 116 from a determination result in the first diagnosis mode and determine whether there is a failure of the contactor 115 from a determination result in the second diagnosis mode.

Modification Example 1 of Second Embodiment

Modification Example 1 of the second embodiment will be described. In the second embodiment, the example in which the batteries 121 and 122 include the bidirectional switches has been described. Instead of this, the modification example relates to an example in which the electric circuit 110 includes a bidirectional switch.

Figure 8:
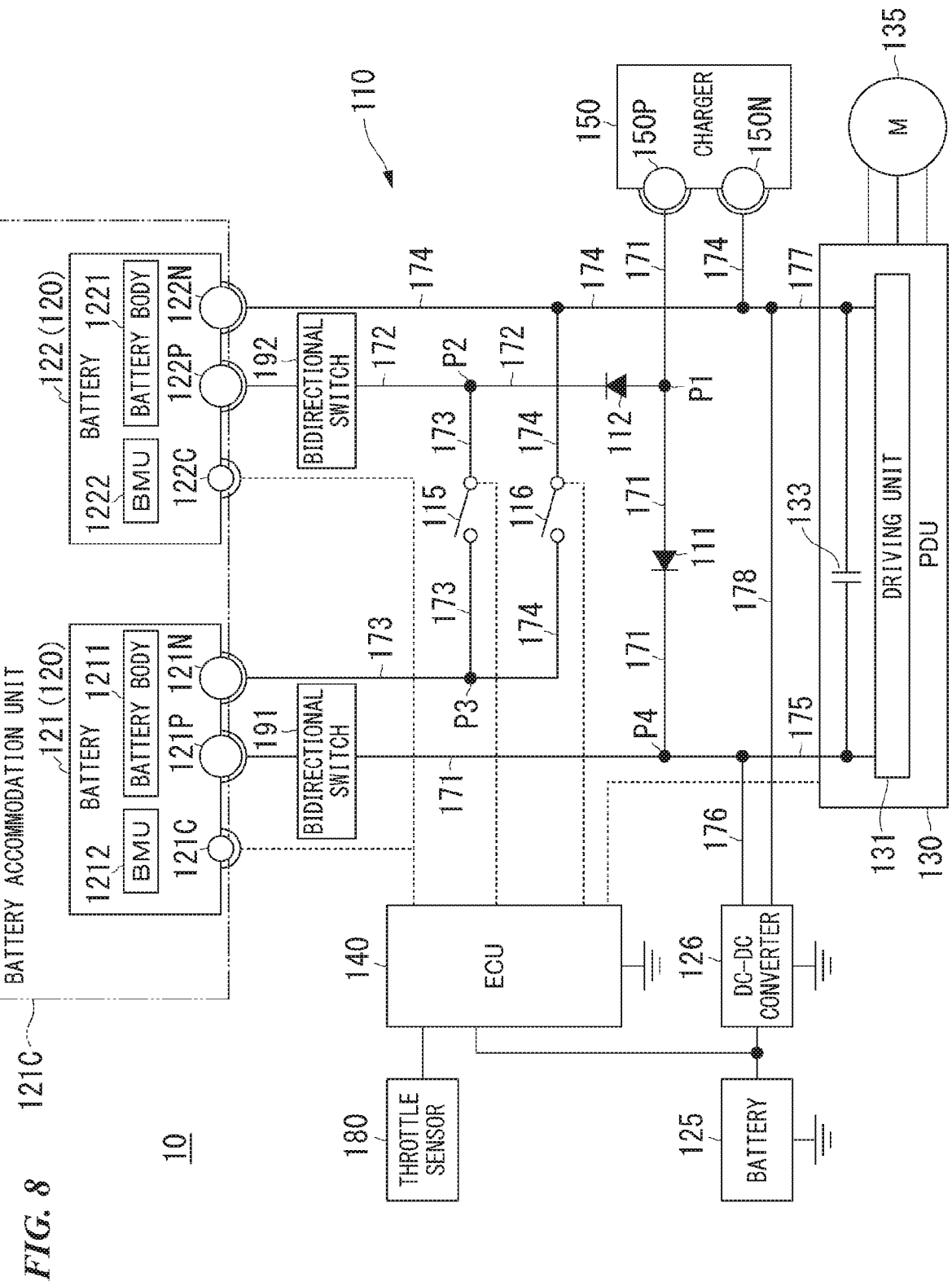
FIG. 8 is a block diagram showing a schematic configuration of a control system controlling travel of an electric motorcycle 1 according to a modification example of the second embodiment.

FIG. 8 is a block diagram showing a schematic configuration of a control system controlling travel of the electric motorcycle 1 according to the modification example.

The control system 10 includes the electric circuit 110, the battery 120, the PDU 130, the ECU 140, and the charger 150.

The electric circuit 110 include the diodes 111 and 112, the contactors 115 and 116, bidirectional switches 191 and 192, the batteries 121 and 122, and conductors 171 to 175 connecting them.

The bidirectional switches 191 and 192 are equivalent to the above-described bidirectional switches 1213 and 1223. For example, the bidirectional switch 191 is provided between the branch point P4 in the conductor 171 and the high-potential side terminal 121P of the battery 121. The bidirectional switch 192 is provided between the branch point P2 in the conductor 172 and the high-potential side terminal 122P of the battery 122.

The battery 121 according to the embodiment includes the battery body 1211 and the BMU 1212.

The battery 122 according to the embodiment includes the battery body 1221 and the BMU 1222. For example, the BMU 1212 notifies the ECU 140 to be described below of information regarding the state of the battery body 1211.

The ECU 140 limits charging or discharging of the battery body 1211 or the like by controlling the bidirectional switches 191 and 192 or the like in accordance with the foregoing monitoring results by the BMUs.

The electric circuit 110 that has the above-described configuration may be used so that the ECU 140 perform similar processes to those of the second embodiment.

According to the foregoing modification example, similar advantageous effects to those of the second embodiment are obtained even in the example in which the battery 120 including no bidirectional switch is used. Further, the bidirectional switches 191 and 192 can be controlled under the control of the ECU 140 and safety in a case in which the battery 120 including no bidirectional switch is applied can be ensured.

Third Embodiment

A third embodiment will be described. The position of the contactor 115 in the first embodiment is closer to the branch point P2 than the branch point P3 in the conductor 173. Instead of this, the position of the contactor 115 according to the embodiment is modified as follows.

Figure 9:
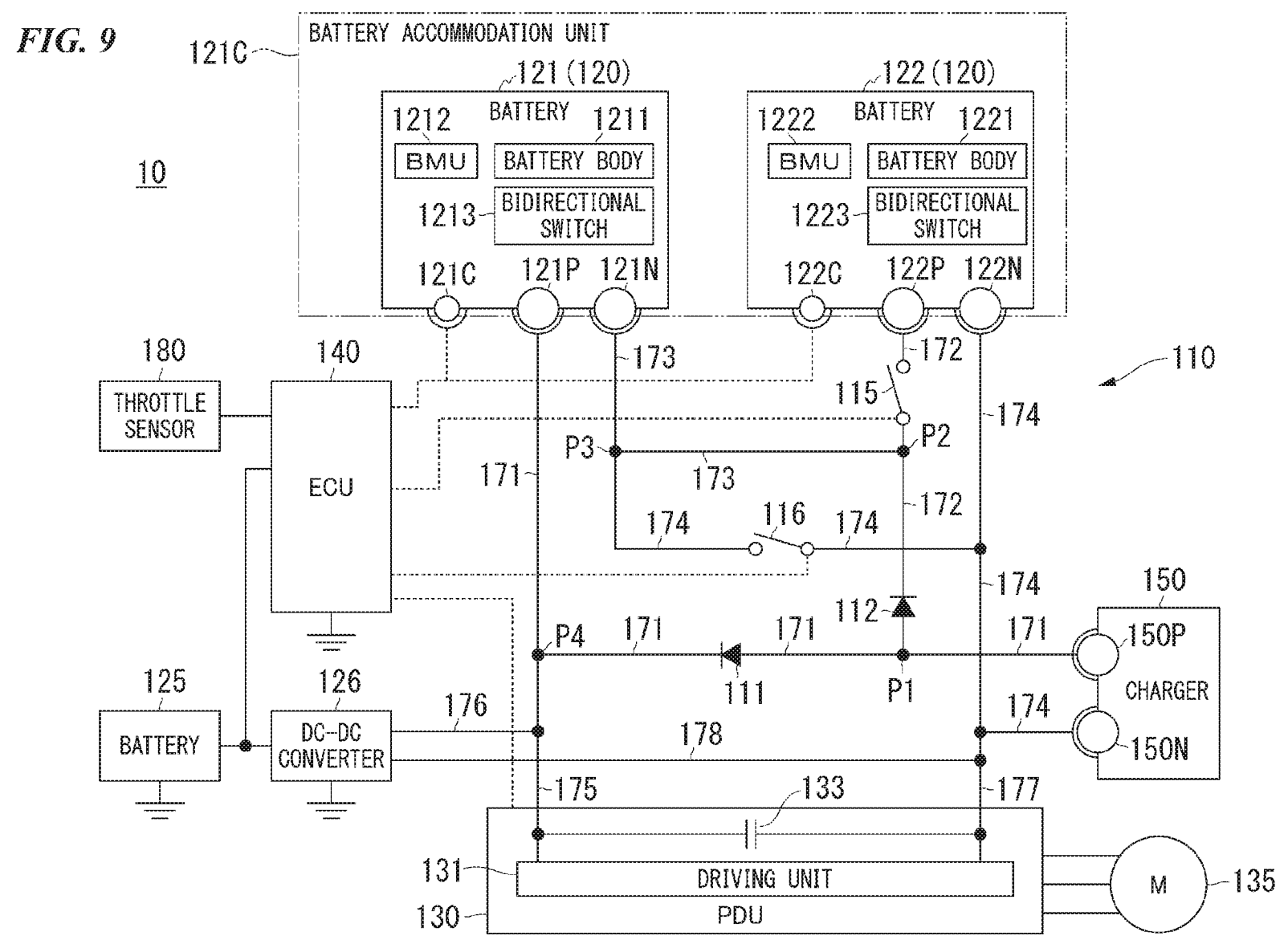

FIG. 9 is a block diagram showing a schematic configuration of a control system controlling travel of the electric motorcycle 1 according to the embodiment.

The control system 10 includes the electric circuit 110, the batteries 120, the PDU 130, the ECU 140, and the charger 150.

The electric circuit 110 include the diodes 111 and 112, the contactors 115 and 116, and conductors 171 to 178.

The contactor 115 (first contactor) according to the embodiment switches between connection and non-connection between the low-potential side terminal 121P of the battery 121 and the high-potential side terminal 121P of the battery 122. For example, the contactor 115 is provided between the high-potential side terminal 121P of the battery 121 and the high-potential side terminal 122P of the battery 122 and between the low-potential side terminal 121N of the battery 121 and the high-potential side terminal 122P of the battery 122. The contactor 115 connects the batteries 120 in series and releases the series connection of the batteries 120.

For example, the contactor 115 is provided at the following position.

The conductor 172 electrically connects the branch point P1 to the high-potential side terminal 122P of the battery 122. The diode 112 and the contactor 115 are interposed in the conductor 172. For example, a cathode of the diode 112 is connected to the high-potential side terminal 122P of the battery 122 and an anode of the diode 112 is connected to the high-potential side terminal 150P of the charger 150 via the branch point P1. A branch point P2 (second branch point) is provided between the cathode of the diode 112 and the high-potential side terminal 122P of the battery 122. The contactor 115 according to the embodiment is provided between the branch point P2 and the high-potential side terminal 122P of the battery 122.

The conductor 173 electrically connects the branch point P2 to the low-potential side terminal 121N of the battery 121. A branch point P3 (third branch point) is provided in the conductor 173.

The connection other than the foregoing connection is similar to that of the first embodiment.

The ECU 140 according to the embodiment may perform similar processes as those of the first or second embodiment.

According to the foregoing embodiment, similar advantageous effects to those of the first embodiment can be obtained and the contactor 115 can also be configured to be inserted into the conductor 172 to be closer to the battery 122 than the branch point P2.

Fourth Embodiment

A fourth embodiment will be described. The batteries 120 according to the first to third embodiments include two batteries. Instead of this, the batteries 120 according to the embodiment include three batteries. Hereinafter, differences will be mainly described.

Figure 10:
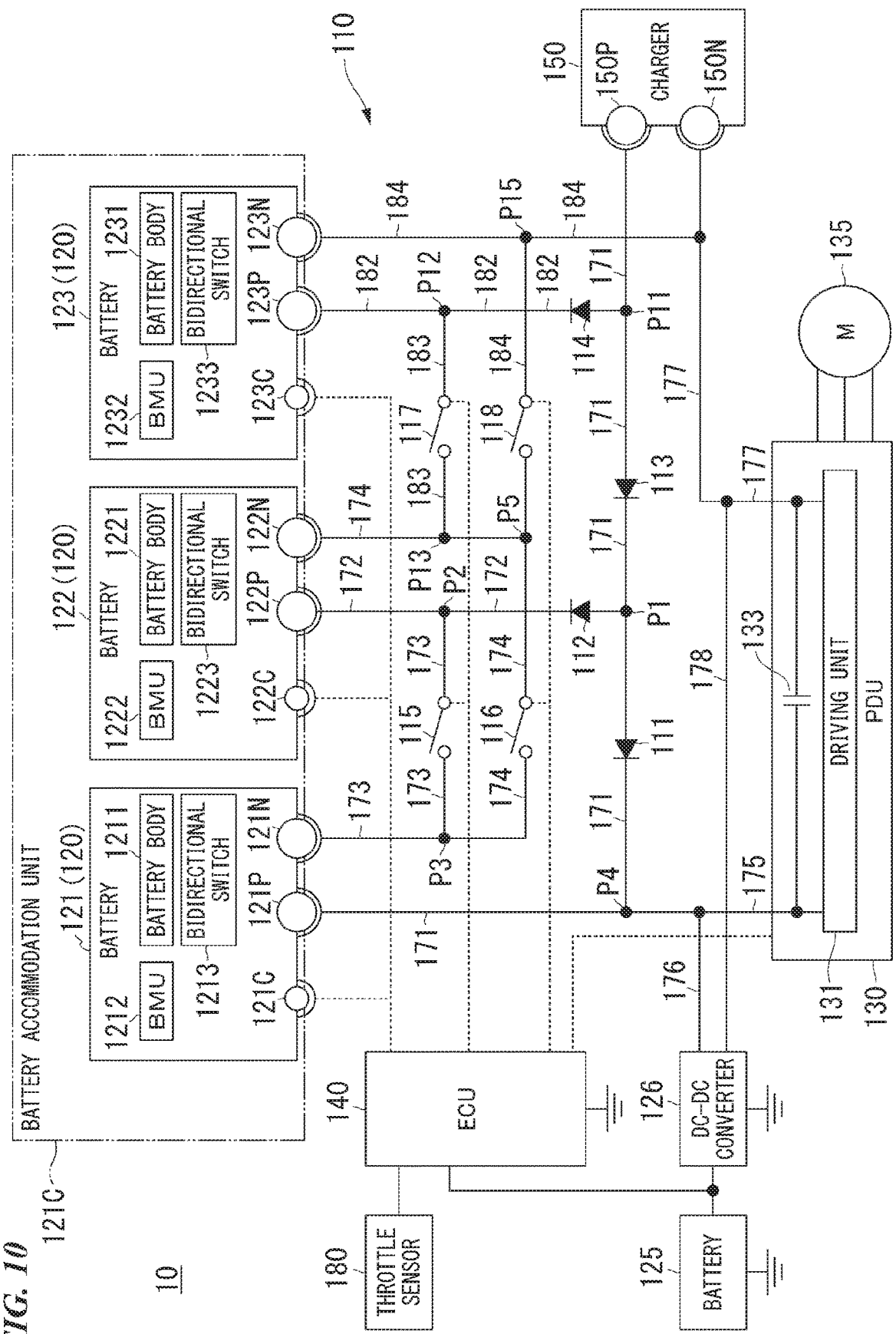
FIG. 10 is a block diagram showing a schematic configuration of a control system controlling travel of the electric motorcycle 1 according to a fourth embodiment.

FIG. 10 is a block diagram showing a schematic configuration of a control system controlling travel of the electric motorcycle 1 according to the embodiment.

The control system 10 includes the electric circuit 110, the batteries 120, the PDU 130 (load), the ECU 140 (control unit), and the charger 150 (power supply).

The electric circuit 110 include the diodes 111, 112, 113, and 114, the contactors 115, 116, 117, and 118, the conductors 171 to 178, and conductors 182 to 184.

The batteries 120 include, for example, batteries 121, 122, and 123. For example, the batteries 121, 122, and 123 have the same configuration.

The diode 113 rectifies a current flowing between the branch point P1 and the high-potential side terminal 150P of the charger 150. For example, the diode 113 causes a current to flow in a direction oriented from the high-potential side terminal 150P of the charger 150 to the branch point P1.

The diode 114 rectifies a current flowing between the high-potential side terminal 150P of the charger 150 and a high-potential side terminal 123P (first pole terminal) of the battery 123 (third storage cell unit). For example, the diode 113 causes a current to flow in a direction oriented from the high-potential side terminal 150P of the charger 150 to the high-potential side terminal 123P of the battery 123.

The currents flowing in the diodes 111, 112, and 114 are different from each other. The polarity of each of the high-potential side terminal 150P of the charger 150, the high-potential side terminal 121P of the battery 121, the high-potential side terminal 122P of the battery 122, and the high-potential side terminal 123P of the battery 123 is the same polarity and is, for example, positive polarity in the embodiment.

The contactor 117 (first contactor) switches between connection and non-connection of the low-potential side terminal 122N of the battery 122 and the high-potential side terminal 123P of the battery 123. For example, the contactor 115 is provided between the high-potential side terminal 122P of the battery 122 and the high-potential side terminal 123P of the battery 123, that is, between the low-potential side terminal 122N of the battery 122 and the high-potential side terminal 123P of the battery 123. The contactor 117 contributes to the series connection of the batteries 120 in the conductive state and releases the series connection of the batteries 120 in the cutoff state.

The contactor 118 (second contactor) switches between connection and non-connection of the low-potential side terminal 122N of the battery 122 and the low-potential side terminal 123N of the battery 123. For example, the contactor 118 connects the low-potential side terminal 122N of the battery 122 to the low-potential side terminal 123N of the battery 123 in the conductive state. A period in which the contactor 118 is in the conductive state includes at least a period in which the charger 150 supplies power to the batteries 120.

Both ends of the batteries 120 connected in series are connected to the PDU 130. The batteries 121, 122, and 123 in the batteries 120 are connected in series or connected in parallel in accordance with switching of the state of the contactors 115, 116, 117, and 118. The contactors 115, 116, 117, and 118 and the diodes 111, 112, 113, and 114 are examples of a connection switching device.

The connection configuration showed in FIG. 10 is exemplary and can be appropriately modified without being limited thereto.

The electric circuit 110 that has the foregoing configuration is used so that the ECU 140 can perform similar processes as the processes described in the first or second embodiment.

As described above, the batteries 120 according to the embodiment include three batteries. The ECU 140 performs charging at a charging voltage separately at three stages when the charging of the capacitor 133 starts, and thus it is possible to further reduce a rush current.

For example, in a first stage, the battery 121 is discharged to charge the capacitor 133. In a second stage, the batteries 121 and 122 are connected in series and discharged to charge the capacitor 133. In a third stage, the batteries 121, 122, and 123 are connected in series and discharged to charge the capacitor 133.

Although detailed description is omitted, the bidirectional switch in each battery and each contactor state may be diagnosed at the stage at which the foregoing capacitor 133 is charged, as in the second embodiment.

According to the foregoing embodiments, similar advantageous effects as those of the first embodiment can be obtained and application to a case in which three or more batteries are combined to configure the batteries 120 can also be achieved, and thus the electric circuit 110 can be configured more simply and at least the power stored in the batteries 121, 122, and 123 can be used.

According to at least one of the above-described embodiments, there is provided an electric circuit (110) that switches connection among a plurality of storage cell units (120) including a first storage cell unit (121) and a second storage cell unit (122), a load (130) of the plurality of storage cell units, and a power supply (150) supplying power to the plurality of storage cell units. The electric circuit includes: a first rectifier (111) configured to rectify a current flowing between a first pole terminal (150P) of the power supply and a first pole terminal (121P) of the first storage cell unit with homopolarity as polarity of the first pole terminal of the power supply; a second rectifier (112) configured to rectify a current being different from the current and flowing between the first pole terminal of the power supply and a first pole terminal (122P) of the second storage cell unit with homopolarity as the polarity of the first pole terminal of the power supply; and a connection switching device (115, 116) configured to connect the plurality of storage cell units in series between the first pole terminal of the first storage cell unit and the first pole terminal of the second storage cell unit and release the series connection of the plurality of storage cell units during a period in which the power supply supplies power to the plurality of storage cell units. Thus, the power stored in the plurality of storage cell units can be used with a simpler configuration.

The ECU 140 according to the embodiment includes a computer system. The ECU 140 may perform the above-described various processes by recording a program for realizing the foregoing processes on a computer-readable recording medium and causing the computer system to read the program recorded on the recording medium to execute the recorded program. The "computer system" mentioned here may include an OS or hardware such as a peripheral device. The "computer-readable recording medium" refers to a storage device such as a flexible disc, a magneto-optical disc, a ROM, a writable non-volatile memory such as a flash memory, a portable medium such as a CD-ROM, or a hard disk contained in the computer system.

Further, the "computer-readable recording medium" is assumed to include a memory that retains a program for a certain time, such as a voltage memory (for example, a dynamic random access memory (DRAM)) in a computer system serving as a client or a server when a program is transmitted via a network such as the Internet or a communication circuit such as a telephone circuit. The program may be transmitted from a computer system in which the program is stored in a storage device or the like to another computer system through a transmission medium or transmission waves in the transmission medium. Here, the "transmission medium" transmitting a program refers to a medium that has a function of transmitting information, such as a network (communication network) such as the Internet or a communication circuit (communication line) such as a telephone circuit. The program may realize some of the above-described functions. Further, the program may also be a program combined with a program in which the above-described functions are previously recorded on a computer system, a so-called differential file (differential program).

While preferred embodiments of the invention have been described and showed above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Electric motorcycle (moving object)
110 Electric circuit
115, 116, 117, 118 Contactor (connection switching device)
120, 121, 122, 123 Battery (storage cell unit)
120C Battery accommodation unit (accommodation unit)
130 PDU (load)
133 Capacitor (third storage cell unit)
135 Electric motorcycle
140 ECU (control unit)
150 Charger (power supply)
171, 172, 173, 174, 175, 176, 177, 178 Conductor
1212, 1222, 1232 BMU

What is claim is:

1. An electric circuit that switches connection among a plurality of storage cell units including a first storage cell unit and a second storage cell unit, a load of the plurality of storage cell units, and a power supply supplying power to the plurality of storage cell units, the electric circuit comprising:
   a first rectifier configured to rectify a current flowing between a first pole terminal of the power supply and a first pole terminal of the first storage cell unit with homopolarity with the first pole terminal of the power supply;
   a second rectifier configured to rectify a current being different from the current and flowing between the first pole terminal of the power supply and a first pole terminal of the second storage cell unit with homopolarity with the first pole terminal of the power supply; and
   a connection switching device configured to connect the plurality of storage cell units in series between the first pole terminal of the first storage cell unit and the first pole terminal of the second storage cell unit and release the series connection of the plurality of storage cell units during a period in which the power supply supplies power to the plurality of storage cell units,
   wherein the connection switching device includes
      a first contactor configured to switch connection and non-connection between a second pole terminal with heteropolarity with the first pole terminal of the first storage cell unit and the first pole terminal of the second storage cell unit, and
      a second contactor configured to switch connection and non-connection between the second pole terminal of the first storage cell unit and a second pole terminal with heteropolarity with the first pole terminal of the second storage cell unit,
   the electric circuit further comprising:
      a control unit configured to switch between a first connection mode in which the first storage cell unit and the second storage cell unit are connected in parallel and a second connection mode in which a third storage cell unit is connected in parallel to both ends of a pair of the first storage cell unit and the second storage cell unit connected in series,
   wherein the third storage cell unit is equipped in the load,
   wherein the connection switching device is able to electrically connect the first storage cell unit and the third storage cell unit in parallel, and
   wherein the control unit switches among the first connection mode, the second connection mode, and a third connection mode in which the first storage cell unit and the third storage cell unit are electrically connected in parallel.

2. The electric circuit according to claim 1,
   wherein both ends of a pair of the plurality of storage cell units connected in series are connected to the load, and
   wherein the connection switching device performs switching to connect the plurality of storage cell units in series.

3. The electric circuit according to claim 1, wherein the connection switching device performs switching to release the series connection and connect the plurality of storage cell units in parallel to the power supply.

4. The electric circuit according to claim 1, wherein, when the first contactor is in a conductive state and the second contactor is in a cutoff state, power is supplied from the first storage cell unit and the second storage cell unit to the load.

5. The electric circuit according to claim 1, wherein, when the first contactor is in the cutoff state and the second contactor is in the conductive state, power is supplied from the power supply to the first storage cell unit and the second storage cell unit.

6. The electric circuit according to claim 1,
   wherein the control unit controls the first contactor to be in the cutoff state and controls the second contactor to be in the conductive state in the first connection mode, and
   wherein the control unit controls the first contactor to be in the conductive state and controls the second contactor to be in the cutoff state in the second connection mode.

7. The electric circuit according to claim 1, further comprising:
   a first bidirectional switch configured to cut a charging or discharging current of the first storage cell unit; and
   a second bidirectional switch configured to cut a charging or discharging current of the second storage cell unit.

8. The electric circuit according to claim 1, wherein the first storage cell unit and the second storage cell unit are provided in a moving object including the load and are supplied with electricity by a power supply provided outside of the moving object.

9. The electric circuit according to claim 8,
   wherein an accommodation unit accommodating each of the first storage cell unit and the second storage cell unit is provided in the moving object, and
   wherein the first storage cell unit and the second storage cell unit are accommodated in the accommodation unit to be easily detachably mounted.

10. The electric circuit according to claim 1, further comprising:
    a first conductor configured to electrically connect the first pole terminal of the first storage cell unit to the first pole terminal of the power supply via the first rectifier; and
    a second conductor configured to electrically connect a first branch point provided in the first conductor to the first pole terminal of the second storage cell unit via the second rectifier.

11. The electric circuit according to claim 10, further comprising:
    a third conductor configured to electrically connect a second branch point, provided in the second conductor to be closer to the first pole terminal of the second storage cell unit than the second rectifier, to the second pole terminal of the first storage cell unit; and
    a fourth conductor configured to electrically connect a third branch point provided in the third conductor to a second pole terminal with heteropolarity with the first pole terminal of the power supply,
    wherein the first contactor is interposed to be closer to the second branch point than the third branch point in the third conductor or closer to the second storage cell unit than the second branch point of the second conductor, and
    wherein the second contractor is interposed in the fourth conductor.

12. The electric circuit according to claim 1,
    wherein the polarity of the first pole terminal of the power supply is positive polarity,
    wherein the first rectifier causes a current to flow in a direction oriented from the first pole terminal of the power supply to the first pole terminal of the first storage cell unit, and wherein the second rectifier causes a current to flow in a direction oriented from the first pole terminal of the power supply to the first pole terminal of the second storage cell unit.

13. A diagnosis method for an electric circuit that switches connection among a plurality of storage cell units including a first storage cell unit and a second storage cell unit, a load of the plurality of storage cell units, and a power supply supplying power to the plurality of storage cell units, wherein the electric circuit includes
- a first rectifier configured to rectify a current flowing between a first pole terminal of the power supply and a first pole terminal of the first storage cell unit with homopolarity with the first pole terminal of the power supply,
- a second rectifier configured to rectify a current being different from the current and flowing between the first pole terminal of the power supply and a first pole terminal of the second storage cell unit with homopolarity with the first pole terminal of the power supply, and
- a connection switching device configured to connect the plurality of storage cell units in series between the first pole terminal of the first storage cell unit and the first pole terminal of the second storage cell unit and release the series connection of the plurality of storage cell units during a period in which the power supply supplies power to the plurality of storage cell units, wherein the connection switching device includes
- a first contactor configured to switch connection and non-connection between a second pole terminal with heteropolarity with the first pole terminal of the first storage cell unit and the first pole terminal of the second storage cell unit, and
- a second contactor configured to switch connection and non-connection between the second pole terminal of the first storage cell unit and a second pole terminal with heteropolarity with the first pole terminal of the second storage cell unit, and wherein the diagnosis method comprises:
- performing a first diagnosis mode in which the first contactor is set to a cutoff state, the second contactor is set to a conductive state, and a voltage of a capacitor equipped in the load is determined; and
- performing a second diagnosis mode in which the first contactor is set to the conductive state, the second contactor is set to the cutoff state, and a voltage of a capacitor equipped in the load is determined, after the first diagnosis mode.

14. The diagnosis method for the electric circuit according to claim 13, further comprising:
determining presence or absence of a failure of the second contactor from a result of determination in the first diagnosis mode.

15. The diagnosis method for the electric circuit according to claim 13, further comprising:
determining presence or absence of a failure of the first contactor from a result of determination in the second diagnosis mode.

* * * * *